United States Patent
Luth et al.

(10) Patent No.: US 6,446,044 B1
(45) Date of Patent: Sep. 3, 2002

(54) MULTI-LAYER SURVEYING SYSTEMS AND METHODS WITH MULTI-LAYER INCENTIVES

(75) Inventors: Roseanne Luth; Charles T. Rosen, both of Rancho Santa Fe, CA (US)

(73) Assignee: Luth Research Inc., San Diego, CA (US)

( * ) Notice: Subject to any disclaimer, the term of this patent is extended or adjusted under 35 U.S.C. 154(b) by 28 days.

(21) Appl. No.: 09/629,740

(22) Filed: Jul. 31, 2000

(51) Int. Cl.[7] .............................................. G06F 17/60
(52) U.S. Cl. ....................................................... 705/14
(58) Field of Search ........................................... 705/14

(56) References Cited

U.S. PATENT DOCUMENTS

| | | | |
|---|---|---|---|
| 4,603,232 A | 7/1986 | Kurland et al. | 379/92.04 |
| 5,025,372 A | 6/1991 | Burton et al. | 705/14 |
| 5,502,636 A | 3/1996 | Clarke | 705/10 |
| 5,537,314 A | 7/1996 | Kanter | 705/14 |
| 5,717,860 A * | 2/1998 | Graber et al. | 709/228 |
| 5,740,035 A | 4/1998 | Cohen et al. | 705/10 |
| 5,855,008 A | 12/1998 | Goldhaber et al. | 705/14 |
| 5,857,175 A | 1/1999 | Day et al. | 705/14 |
| 5,893,075 A | 4/1999 | Plainfield et al. | 705/14 |
| 5,893,098 A | 4/1999 | Peters et al. | 707/10 |
| 5,970,467 A | 10/1999 | Alavi | 705/10 |
| 5,970,469 A | 10/1999 | Scroggie et al. | 705/14 |
| 6,009,411 A | 12/1999 | Kepecs | 705/14 |
| 6,151,581 A | 11/2000 | Kraftson et al. | 705/3 |
| 6,175,833 B1 | 1/2001 | West et al. | 707/102 |
| 6,195,652 B1 | 2/2001 | Fish | 707/2 |
| 6,189,029 B1 | 3/2001 | Fuerst | 709/217 |
| 6,250,930 B1 | 6/2001 | Mintz | 434/323 |
| 6,289,318 B1 * | 9/2001 | Barber | 705/14 |

FOREIGN PATENT DOCUMENTS

| DE | 3417417 A1 | 11/1985 |
| WO | WO 93/12489 | * 6/1993 |

OTHER PUBLICATIONS

Berthon, Pierre, "Marketing communication and the world wide web", Business Horizons, vol. 39, No. 5, p. 24(9).*
Grimes & Reese, "Legal Principles of Multilevel Marketing", copyright 1996, copied on Mar. 14, 2002, from http://ww.mlmlaw.com/library/guides/Primer.htm.*
Webster's Third New International Dictionary, 1993 ed. (Springfield, MA: Merriam Webster): 2302.*

* cited by examiner

Primary Examiner—Donald L. Champagne
(74) Attorney, Agent, or Firm—Fleshner & Kim, LLP (57) ABSTRACT

A system and method for collecting data includes receiving first identification information of a first user, receiving second identification information of a second user that is referred to the data collector by the first user, analyzing the second identification information, determining whether to receive second user data based on the analysis of the second identification information and rewarding the first user if the second user data is received.

43 Claims, 5 Drawing Sheets

MULTI-LAYER SURVEYING SYSTEMS AND METHODS WITH MULTI-LAYER INCENTIVES

BACKGROUND OF THE INVENTION

1. Field of the Invention

The invention relates to systems and methods of data collection and obtaining respondents for data collection. More particularly, the invention relates to systems and methods of conducting surveys and collecting information.

2. Background of the Related Art

Surveys and other data collection techniques have been used extensively in the field of marketing research. Traditional forms of surveying or data collection are plagued with many problems, at least two of which result in severe inefficiencies. First, traditional surveys, such as telephone surveys or face-to-face surveys conducted in public places such as shopping malls produce a very small number of participants relative to the number of people solicited. Further, many of those who are contacted find such unsolicited contact offensive, which could result in negative publicity for the product or organization for which the survey is being conducted.

Second, the low response rate to a traditional survey is compounded by the fact that a large percentage of the people completing the survey may not be members of a desired target audience.

As a result, traditional surveying or data collecting techniques are expensive and time consuming relative to the amount of good quality relevant data collected.

SUMMARY OF THE INVENTION

An object of the invention is to solve at least the above problems and/or disadvantages and to provide at least the advantages described hereinafter.

Another object of the invention is to greatly reduce inefficiencies found in traditional methods of conducting surveys or data collection. Reducing these inefficiencies can greatly increase the quality of the data collected while reducing the cost of collection.

An embodiment of the invention that achieves these objective is a method of soliciting people interested in completing surveys on the internet. Such people would become members of a network of people who are interested in answering surveys. Members of the network are then encouraged to refer friends that are interested in becoming members of the network. Members are rewarded for each survey they complete, each survey completed by members they referred to the network, and each survey completed by members referred to the network by their referrals. This three-tier reward system provides significant incentive not only for members to complete surveys, but for members to refer friends to the network.

An example of a method of the invention is a method of collecting data by a data collector, the method including receiving first identification information of a first user and second identification information of a second user, the second user being referred to the data collector by the first user. The second identification information is then analyzed to determine whether second user data should be received. If the second user data is received, the first user is rewarded.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The invention will be described by way of an embodiment that combines two complementary marketing strategies, viral marketing and multi-level marketing. The embodiment will be explained in the context of an internet-based surveying system. The internet simplifies and accelerates the viral marketing concept of starting with a nucleus of members and then radiating outward in ever-larger marketing spirals. Like a virus, these spirals then spread to even larger numbers of members. The ease with which messages and information can be forwarded to many individuals from just one member makes viral marketing extremely effective.

Multi-level marketing entices current members to recruit new members. Members are not only paid for surveys they complete, but also for surveys completed by those they recruit and by those recruited by their recruits. By offering multi-level incentives, the number of members is increased exponentially.

By combining viral marketing and multi-level marketing with incentives, this embodiment of the invention is an extremely effective and efficient surveying system that can result in a very detailed and extensive data base of members who are willing to complete surveys in exchange for rewards, for example, cash.

Research conducted by the inventors indicates that the most effective form of motivation to entice people to complete surveys is a cash payment. In one embodiment of the invention, a first member is paid three dollars for completing a survey. When a second member, referred to the system by the first member, completes a survey, the second member is paid three dollars and the first member is paid two dollars. When a third member, referred to the system by the second member, completes a survey, the third member is paid three dollars, the second member is paid two dollars and the first member is paid one dollar. When a fourth member, referred to the system by the third member, completes a survey, the fourth member is paid three dollars, the third member is paid two dollars, and the second member is paid one dollar. In this embodiment, the multi-level incentives stop after the third layer. However, in other embodiments of the invention, the multi-level incentives can continue to as many levels as the operator of the system deems appropriate. Similarly, a system with only two levels of incentives is also possible.

Figure 1:
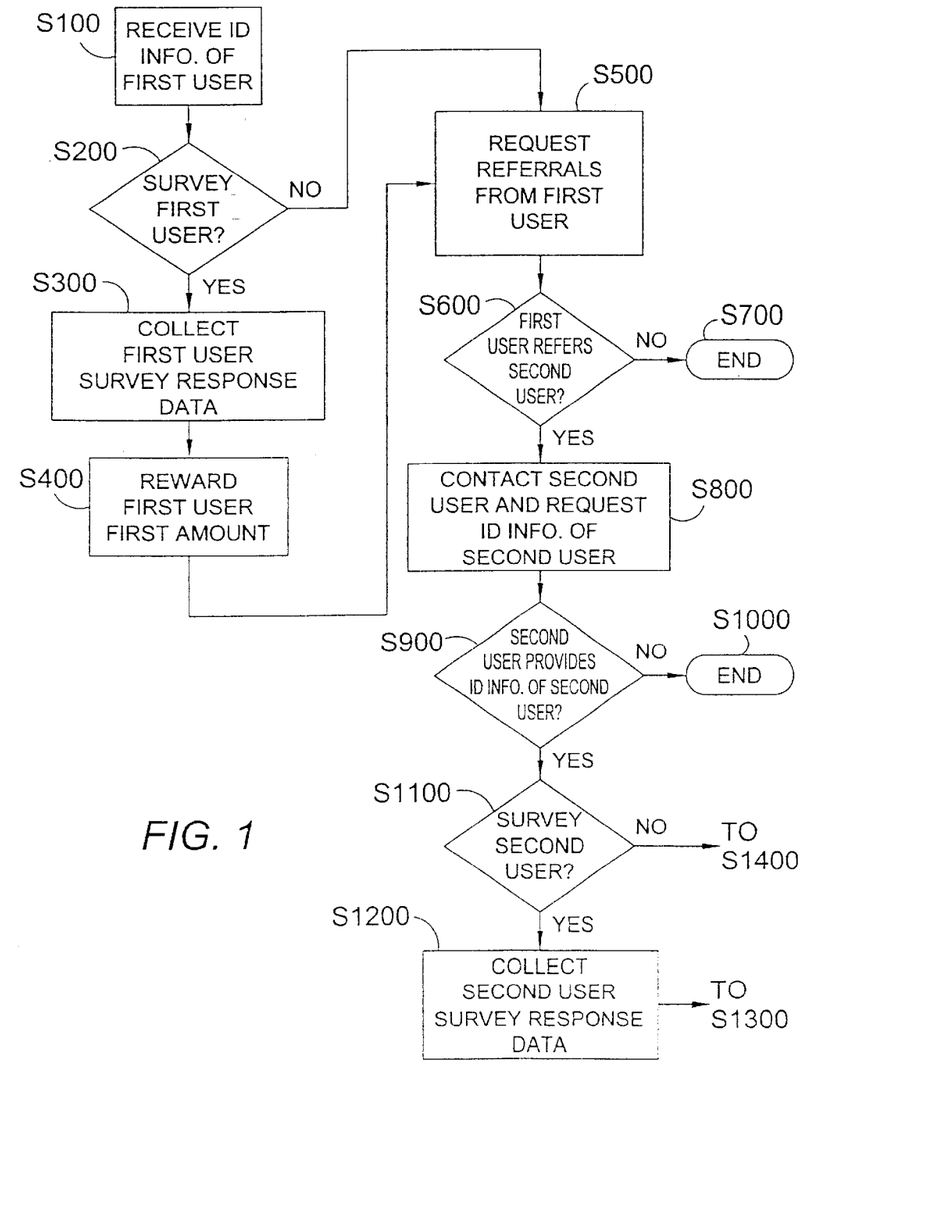
FIG. 1 is a first portion of a flow chart showing an embodiment of the invention.
Figure 2:
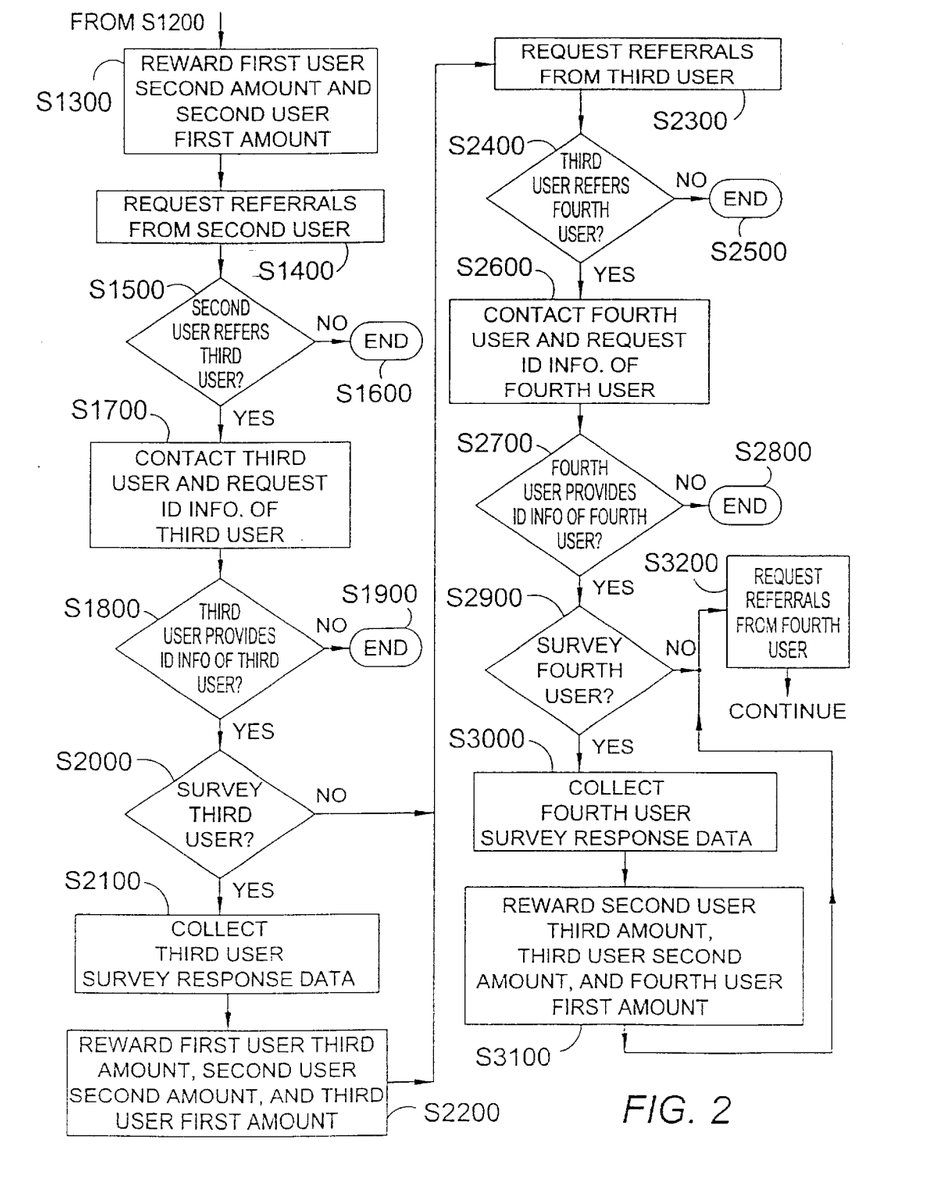
FIG. 2 is a continuation of the flow chart shown in FIG. 1.

FIGS. 1 and 2 show a flow chart that will be used to explain one embodiment of the invention. In step S100, identification information of a first user is received by the system. The identification information of the first user can be relatively simple, general information or extremely thorough and detailed information, depending on how specific a target group is desired. Very detailed and extensive user identification information is more desirable because it allows the system operator to more specifically define target groups for particular surveys. However, some users prefer not to give detailed information and, therefore, requests for detailed user identification information can result in fewer participants in the system. The user identification information can be any information specific to that user, such as, for example, age, race, sex, income, occupation, type of home, type of vehicles driven, hobbies and interest, etc. The first user can be contacted in order to request the user identification information by any means. For example, the first user may be contacted by a random mailing, a mass e-mail, etc.

Figure 3:
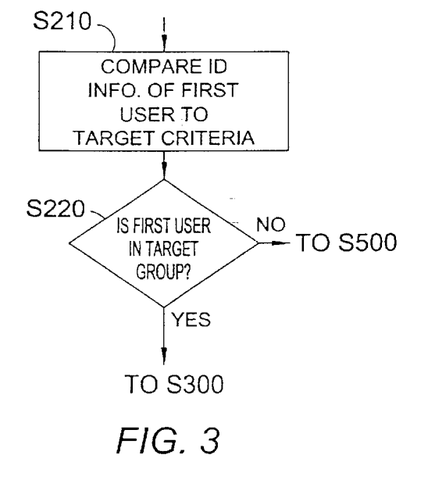
FIG. 3 is a flow chart showing a detailed example of one of the decisions in the flow chart of FIG. 1.

After the identification information of the first user is received, it is then determined, in step S200 whether the first user should be surveyed. FIG. 3 shows one example of the process of determining whether the first user should be surveyed. In step S210 the identification information of the first user is compared to target criteria for a particular survey. In step S220, it is determined whether the first user is in the target group. The decision of step S220 can be based on a predetermined portion of the identification information of the first user matching the target criteria or the decision can be based on an absolute match of all identification information of the first user to the target criteria. For example, if the first user falls into a target income range, it could be determined that the first user should be surveyed. If it is determined that the first user should not participate in the current survey, processing proceeds to step S500 (discussed below). If, however, it is determined in step S200 that the first user should complete the current survey, processing proceeds to step S300 where the first user survey response data is collected from the first user.

Step S400 the first user is rewarded a predetermined amount for completing the survey. Processing then continues on to step S500 where the system request referrals from the first user. As discussed above, the first user is motivated to refer other potential users because he is rewarded for each survey completed by anyone he refers to the system. Further, he is also rewarded for surveys completed by users referred to the system by those users he referred to the system.

In step S600, if the first user does not refer any potential users to the system, processing ends in step S700. As an alternative to processing ending in step S700, the first user could be asked to participate in another survey for which he meets the target criteria. If the first user does refer a second user to the system in step S600, processing proceeds to step S800 where the system contacts the second user and requests identification information of the second user. Such contact with the second user can be by phone, mail, or, preferably, e-mail. The contact information can be obtained from the referring first user. As a preferable alternative to step S800, the first user can contact the respective second user himself and the second user can initiate contact with the system if he so desires. Which alternative is best suited for the environment at any particular time can be determined at that particular time. Currently, it is preferable to have the first user initiate contact with the second user and permit the second user to contact the system.

In step S900, if the second user refuses to provide identification information, processing ends at step S1000. If, however, the second user does provide his identification information, processing proceeds to step S1100 where it is determined whether the second user should participate in any current survey or surveys.

If it is determined that the second user does not match the target criteria for any current survey, processing proceed to step S1400 (FIG. 2) where the system requests referrals from the second user. Step S1400 is similar to step S500 except that it is the second user from which referrals are requested. If, however, it is determined in step S100 that the second user should be surveyed, processing proceeds to step S1200 where the second user survey response data is collected.

In step S1300, the second user is rewarded a first amount for completing a survey and the first user is rewarded a second amount (usually less than the first amount) because a user he referred to the system (the second user) completed a survey.

In step S1400 (discussed above) the system then requests referrals from the second user.

Steps S1500 and S1600 are similar to steps S600 and S700, respectively, except that step S1500 concerns referrals by the second user.

Steps S1700–S2100 are similar to steps S800–S1200 except that they concern a third user that is referred to the system by the second user.

In step S2200, the third user is rewarded the first amount for completing a survey, the second user is rewarded the second amount because his referral (the third user) completed a survey, and the first user is rewarded a third amount (usually less than the second amount) because a survey was completed by a user (the third user) that was referred to the system by one of his referrals (the second user). Step S2200 shows an example of the multi-layer incentives of the invention. Although this example involves a three tier incentive, any number of tiers can be used.

Step S2300 is similar to step S1400 except that it concerns the third user.

Steps S2400–S3200 are similar to steps S1500–S2300, except that they concern a fourth user.

As can be seen in S3100, since this embodiment has a three tier incentive, a survey completed by the fourth user results in rewards to the fourth user, the third user, and the second user, but not the first user. If the system of this embodiment had a four tier incentive as opposed to a three tier incentive, the first user would also be rewarded in step S3100.

After step S3200, processing continues by repeatedly requesting referral from users that provide identification information.

Figure 4:
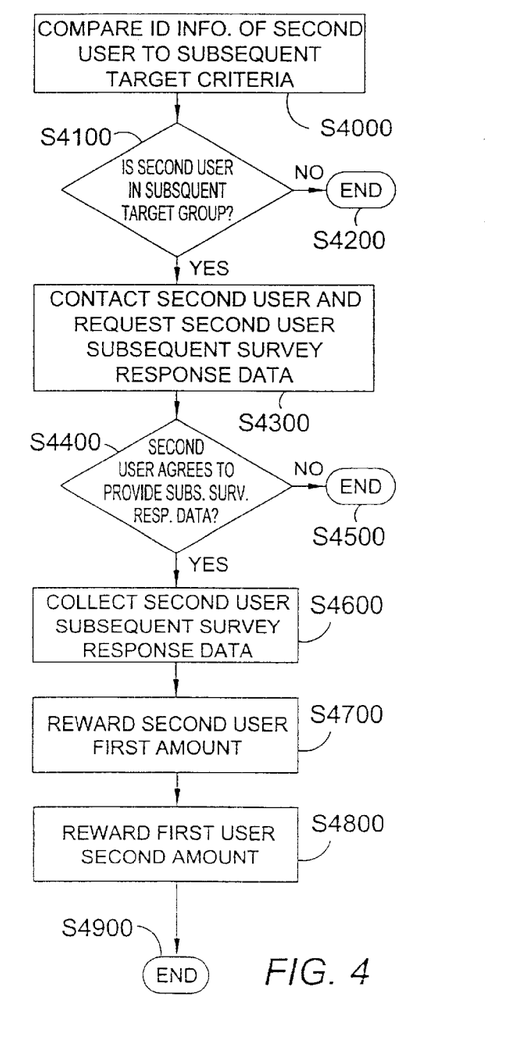
FIG. 4 is a flow chart showing another embodiment of the invention.

The embodiment shown in FIGS. 1–3 deals with surveys conducted by a user immediately after that user provides identification information to the system. However, it is preferable that users completed subsequent surveys as well. FIG. 4 shows an embodiment of a system that rewards users that complete subsequent surveys and rewards users whose referrals complete subsequent surveys.

In step S4000, the second users identification information is compared to subsequent target criteria. In step S4100, it is determined whether the second user is in the subsequent target group. If the second user is not in the subsequent target group, processing ends at step S4200. If, however, it is determined that the second user is in the subsequent target group, processing proceeds to step S4300, where the system contacts the second user and requests that the second user provide response data to a subsequent survey.

In step S4400, if the second user does not agree to provide response data to the subsequent survey, processing ends in step S4500. If, however, the second user agrees to provide response data to the subsequent survey, processing proceeds to step S4600 where the subsequent survey response data is collected from the second user.

In step S4700, the second user is rewarded the first amount for completing the subsequent survey. In step S4800, the first user is rewarded the second amount because his referral (the second user) completed a survey. Processing ends in step S4900.

As can be seen from FIG. 4, in a preferred embodiment, users are rewarded for each survey they complete as well as each survey completed by their referrals. As a result, a user can continue to collect rewards even though he personally participates in no surveys. Although the embodiment shown in FIG. 4 addresses only subsequent surveys completed by the second user and the associated rewards to the first and second users, it is also applicable to subsequent surveys conducted by the third user. Such subsequent surveys completed by the third user would result in rewards to the first, second and third users.

Figure 5:
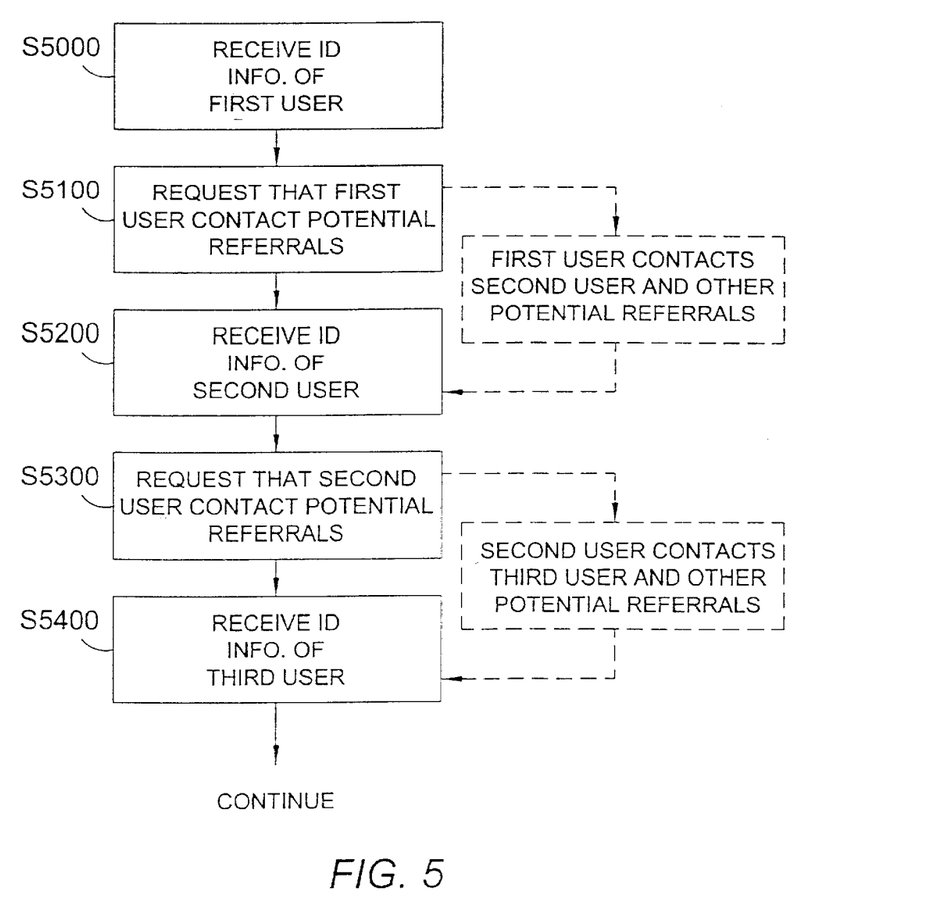
FIGS. 5 and 6 are flow charts showing another embodiment of the invention.
Figure 6:
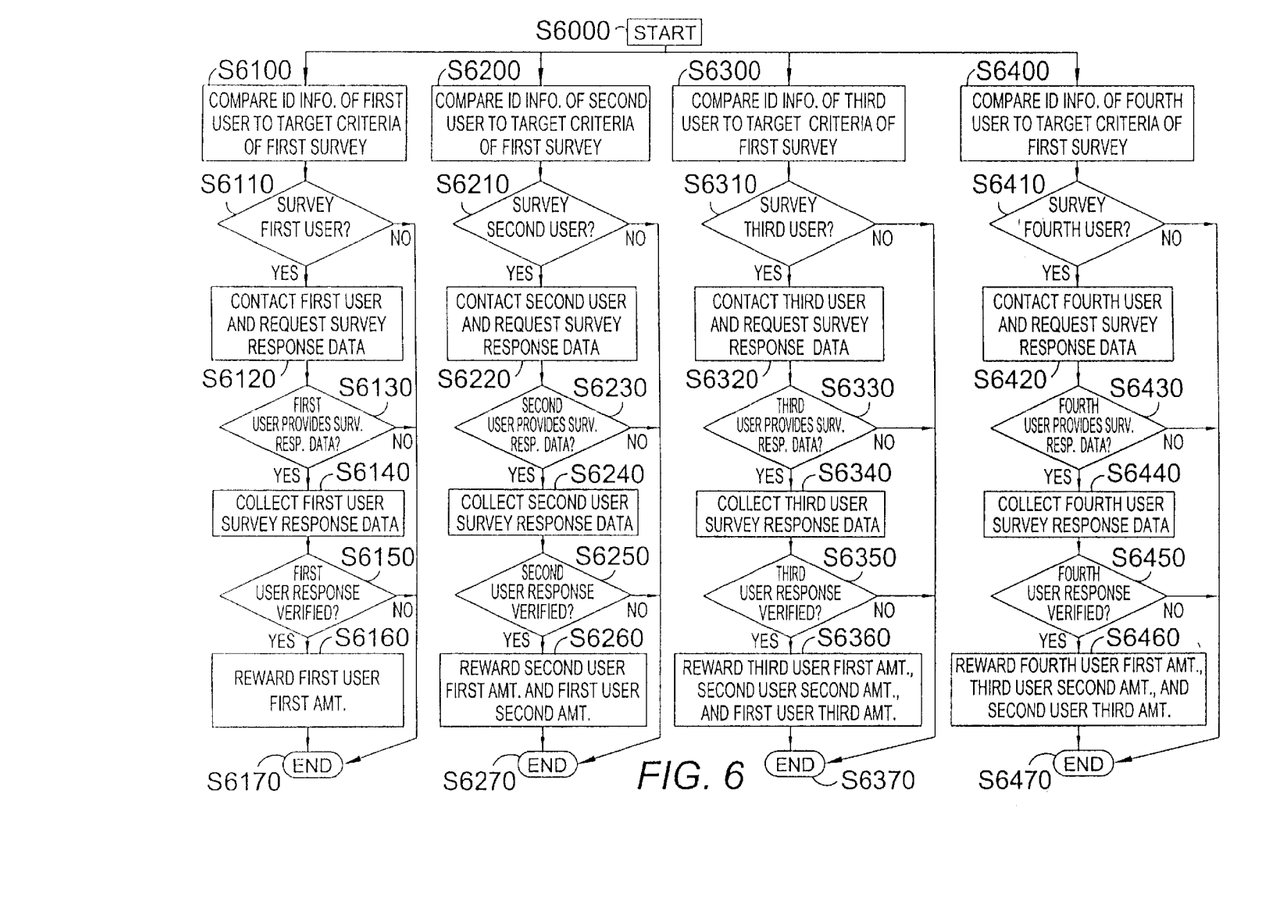

FIGS. 5 and 6 show a preferred embodiment of the invention. FIG. 5 shows an example of a procedure for building a data base of system users. In step S5000, identification information of the first user is received by the system. In step S5100, the system requests that the first user contact potential new users and invite them to join the system. Preferably, this request is in the form of instructions e-mailed to the first user along with an attachment to the e-mail that can be forwarded to potential new users. One example of the attachment is a form requesting the identification information of the potential user and explaining the rules and procedures associated with the use of the system. If the potential user decides to become a user of the system, the potential user fills in the identification information and indicates that the rules and procedures have been read and understood. The potential user then forwards the completed form by e-mail to the system. In this way, new users are not solicited by the system but, instead, are solicited by current users of the system which are, usually, known to the potential user. This procedure avoids the disreputable practice of "spamming".

In step S5200, the system receives the identification information of the new user (hereinafter the "second user") referred to the system by the first user. A verification process is preferably performed after receipt of the identification information to verify that the new user is not already a user of the system.

Steps S5300 and S5400 are similar to steps S5100 and S5200, except that they involve the second user contacting potential users.

This process continues indefinitely as new users, as well as current users, continue to contact further potential users.

FIG. 6 is a flow chart showing a preferred embodiment of the invention with which surveys are conducted. In this example, the consideration of only four users for survey completion is shown. It is understood that an actual survey would consider many users, preferably all users in the data base. The process shown in FIG. 6 will be explained with relation to steps S6100–S6170. However, it is noted that steps S6200–S6270, S6300–S6370, and S6400–S6470 are similar.

Processing is started in step S6000. In step S6100, the identification information of the first user is compared to target criteria of the current survey. In step S6110, it is determined whether the first user should be surveyed. This determination is based on whether the identification information of the first user sufficiently matches the target criteria. If it is determined in step S6110 that the first user should not be surveyed, processing proceeds to step S6170 and ends with regard to the first user. If, however, it is determined that the first user should be surveyed, processing proceeds from step S6110 to step S6120. In step S6120, the first user is contacted and survey response data is requested. In step S6130, it is determined whether the first user provides the requested survey response data. If the first user does not provide survey response data, processing proceeds to step S6170 and ends for the first user. If, however, the first user provides the requested survey response data, processing proceeds from step S6130 to step S6140. In step S6140, the first user survey response data is collected. In step S6150, a verification process is preformed to verify that the first user survey response data is usable data. The verification process can, for example, include cross checking the first user identification information to help prevent a single user from completing the same survey multiple times. If the first user's response to the survey does not pass the verification process of step S6150, processing proceeds to step S6170 and ends for the first user. If, however, the first user's response passes the verification process of step S6150, processing proceeds to step S6160 where the first user is rewarded the first amount for completing the survey. Processing then proceeds to S6170 and ends for the first user.

Steps S6200–S6270 are similar to steps S6100–S6170 except that they relate to a second user referred to the system by the first user. Also, in step S6260, in addition to the second user being rewarded, the first user is rewarded the second amount because the second user was referred to the system by the first user.

Steps S6300–S6370 are similar to steps S6100–S6170, except that they relate to a third user referred to the system by the second user. Also, in step S6360, the third user is rewarded the first amount, the second user is rewarded the second amount and the first user is rewarded the third amount.

Steps S6400–S6470 are similar to steps S6100–S6170, except that they relate to a fourth user referred to the system by the third user. Also, in step S6460, the fourth user is rewarded the first amount, the third user is rewarded the second amount and the second user is rewarded the third amount. The first user does not receive a reward for the fourth user completing a survey because, in this example, the multi-layer incentive is a three-layer incentive.

While a system proceeding in accordance with the above examples is preferably implemented over the internet, it is understood that such a system could also be implemented using telephone surveys or mailed surveys. An advantage of systems of the invention is that once identification information is collected for a particular user, that user is only contacted for a particular survey if that user fits the target criteria for that survey. This greatly improves the quality of the survey results. In addition, because the user has provided his or her identification information, it is known that the user is a willing participant in surveys. This further reduces the overall costs of obtaining quality survey information because resources are not wasted on unwilling participants.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of collecting data by a data collector, comprising:

receiving first identification information of a first user;

receiving second identification information of a second user, the second user being referred to the data collector by the first user;

determining whether to receive second user data based on an analysis of the second identification information;

rewarding the first user a second amount if the second user data is received;

receiving first user data from the first user and rewarding the first user a first amount;

receiving third user data from a third user, the third user being referred to the data collector by the second user;

rewarding the first user a third amount after the third user data is received;

rewarding the second user the second amount after the third user data is received; and rewarding the third user the first amount after the third user data is received.

2. The method of claim 1, further comprising determining whether to receive first user data based on an analysis of the first identification information.

3. The method of claim 2, wherein the first user is rewarded the first amount after the first user data is received.

4. The method of claim 2, wherein the first user data is first user survey response data and the second user data is second user survey response data.

5. The method of claim 1, wherein the second user data is second user survey response data.

6. The method of claim 1, wherein the second user data is initial second user data, the method further comprising:

requesting subsequent second user data;

receiving subsequent second user data; and rewarding the first user a different amount.

7. The method of claim 1, wherein the third user data is initial third user data, the method further comprising:

receiving subsequent third user data; and rewarding the first user the third amount and the second user the second amount.

8. The method of claim 1, wherein the second user data is second user survey response data and the third user data is third user survey response data.

9. The method of claim 1, wherein the first amount, the second amount and the third amount are different.

10. The method of claim 1, wherein the first amount, the second amount and the third amount are substantially the same.

11. The method of claim 1, wherein the first user data is first user survey response data, the second user data is second user survey response data and the third user data is third user survey response data.

12. The method of claim 1, wherein the second user data is received if the second user identification information indicates that the second user is a member of a target group.

13. A computer readable medium having stored thereon a sequence of instructions which, when executed by a processor, cause the processor to perform functions comprising:

receiving first identification information of a first user;

receiving second identification information of a second user, the second user being referred to the processor by the first user;

analyzing the second identification information;

determining whether to receive second user data based on the analysis of the second identification information;

rewarding the first user an initial amount if the second user data is received, the medium further comprising instructions which, when executed by the processor, cause the processor to:

receive subsequent second user data, and reward the first user a second amount, further comprising instructions which, when executed by the processor, cause the processor to, receive third user data from a third user, the third user being referred to the processor by the second user, reward the first user a third amount, reward the second user the second amount, and reward the third user the first amount.

14. The medium of claim 13, further comprising instructions which, when executed by the processor, cause the processor to receive first user data from the first user and rewarding the first user a first amount.

15. The medium of claim 14, wherein the first user is rewarded the first amount after the first user data is received.

16. The medium of claim 14, wherein the first user data is first user survey response data and the subsequent second user data is second user survey response data.

17. The medium of claim 13, wherein the subsequent second user data is second user survey response data.

18. The medium of claim 13, wherein the third user data is initial third user data, the method further comprising instructions which, when executed by the processor, cause the processor to:

receive subsequent third user data; and reward the first user the third amount and the second user the second amount and the third user the first amount upon receipt of the subsequent third user data.

19. The medium of claim 18, wherein the first user, the second user and the third user are rewarded after the third user data is received.

20. The medium of claim 13, further comprising instructions which, when executed by the processor, cause the processor to:

reward the first user for the third user data;

reward the second user for the third user data; and reward the third user for the third user data.

21. The medium of claim 20, wherein the second user data is second user survey response data and the third user data is third user survey response data.

22. The medium of claim 20, wherein the first amount is greater than the second amount.

23. The medium of claim 22, wherein the second amount is greater than the third amount.

24. The medium of claim 20 further comprising instructions which, when executed by the processor, cause the processor to receive first user data from the first user and reward the first user a first amount.

25. The medium of claim 24, wherein the firs t user data is first user survey response data, the second user data is second user survey response data and the third user data is third user survey response data.

26. The medium of claim 13, where in the second user data is received if the second user identification information indicates that the second user is a member of a target group.

27. A method of collecting data, comprising:
providing at least one first user an incentive to provide second identification information of a second user;
analyzing the second identification information to determine whether the second user is a member of a target group;
providing the second user the incentive to provide third identification information of a third user;
analyzing the third identification information to determine whether the third user is a member of a second target group;
rewarding each first user for first user data;
rewarding the at least one first user and the second user if the second user is a member of the target group and second user provides second user data;
rewarding the at least one first user and the second user if the third user is a member of the second target group and the third user provides third user data; and
rewarding the third user for the third user data.

28. The method of claim 27, wherein the steps of providing are performed on a computer network.

29. The method of claim 28, wherein the steps of providing are performed on the internet.

30. The medium of claim 13, further comprising instructions which, when executed by the processor, cause the processor to:
receive third user data from a third user, the third user being referred to the processor by the second user;
reward the first user upon receipt of the third data;
reward the second user upon receipt of the third data; and
reward the third user upon receipt of the third data.

31. The method of claim 27, wherein the second target group is also the target group.

32. The method of claim 27, wherein the second user data is responsive to a survey collecting information, and wherein the target groups and the user data change according to the survey.

33. The method of claim 27, wherein the incentive provided to the first user is a first reward received when the second user is a member of the target group and the second user provides second user data, and wherein the incentive provided to the second user is a second reward received when the third user is a member of the second target group and the third user provides third user data.

34. The method of claim 27, wherein the second user data is responsive to a survey collecting information of a selected target group.

35. The method of claim 27, wherein the target group changes responsive to a survey.

36. The method of claim 27, further comprising:
providing at least one second user an incentive to provide fourth identification information of a fourth user;
analyzing the fourth identification information to determine whether the fourth user is a member of a corresponding target group; and
rewarding the at least one first user and the at least one second user if the fourth user is a member of the corresponding target group and the fourth user provides fourth user data.

37. The method of claim 27, further comprising:
providing at least one third user an incentive to provide fourth identification information of a fourth user;
analyzing the fourth identification information to determine whether the fourth user is a member of a corresponding target group; and
rewarding the at least one first user, the at least one second user and the at least one third user if the fourth user is a member of the corresponding target group and the fourth user provides fourth user data.

38. The method of claim 27, further comprising:
providing at least one third user an incentive to provide fourth identification information of a fourth user;
analyzing the fourth identification information to determine whether the fourth user is a member of a corresponding target group; and
rewarding the at least one second user and the at least one third user if the fourth user is a member of the corresponding target group and the fourth user provides fourth user data.

39. The method of claim 27, wherein the first user receives a money reward after the second and third user data are received.

40. A method for a data collector to build a database of users containing user identification data and determining which users belong to a target group, comprising:
receiving a plurality of first user identification information;
receiving a plurality of second user identification information;
storing at least some of said plurality of first and second user identification information in the data base;
linking certain second users to certain ones of said plurality of first users if said certain ones of said first users referred said certain second users to the data collector;
requesting additional user information from some of said second users;
determining whether any of said second users fall within said target group using said additional user information;
requesting subsequent second user information of said second users within said target group; and
rewarding corresponding second users upon receipt of said subsequent second user information from said corresponding second users and those respective first users that are linked to said corresponding second users.

41. A method of collecting data by a data collector, comprising:
receiving first identification information of a first user;
receiving second identification information of a second user, the second user being referred to the data collector by the first user;
determining whether to receive second user data based on an analysis of the second identification information;
rewarding the first user a second amount if the second user data is received;
receiving first user data from the first user and rewarding the first user a first amount, wherein the second user data is initial second user data, the method further comprises,
requesting subsequent second user data,
receiving subsequent second user data, and
rewarding the first user a different amount;
receiving third user data from a third user, the third user being referred to the data collector by the second user;
rewarding the first user a third amount;
rewarding the second user the second amount; and
rewarding the third user the first amount.

42. A computer readable medium having stored thereon a sequence of instructions which, when executed by a processor, cause the processor to perform functions comprising:
- receiving first identification information of a first user;
- receiving second identification information of a second user, the second user being referred to the processor by the first user;
- analyzing the second identification information;
- determining whether to receive second user data based on the analysis of the second identification information; and
- rewarding the first user an initial amount and rewarding the second user if the second user data is received;
- receiving third user data from a third user, the third user being referred to the data collector by the second user;
- rewarding the first user for the third user data,
- rewarding the second user for the third user data; and
- rewarding the third user for the third user data.

43. A computer readable medium having stored thereon a sequence of instructions which, when executed by a processor, cause the processor to perform functions comprising:
- receiving first identification information of a first user;
- receiving second identification information of a second user, the second user being referred to the processor by the first user;
- analyzing the second identification information;
- determining whether to receive second user data based on the analysis of the second identification information;
- rewarding the first user an initial amount if the second user data is received, the medium further comprising instructions which, when executed by the processor, cause the processor to:
  - receive subsequent second user data, and
  - reward the first user a second amount; receive third user data from a third user, the third user being referred to the processor by the second user;
- reward the first user upon receipt of the third data;
- reward the second user upon receipt of the third data; and
- reward the third user upon receipt of the third data.

* * * * *